US008853883B2

(12) United States Patent
Andris

(10) Patent No.: US 8,853,883 B2
(45) Date of Patent: *Oct. 7, 2014

(54) SYSTEM AND METHODS FOR STARTING A PRIME MOVER OF A POWER SYSTEM

(75) Inventor: Eric M. Andris, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 747 days.

This patent is subject to a terminal disclaimer.

(21) Appl. No.: 12/981,374

(22) Filed: Dec. 29, 2010

(65) Prior Publication Data

US 2012/0169114 A1  Jul. 5, 2012

(51) Int. Cl.
| | |
|---|---|
| B60L 1/00 | (2006.01) |
| B60L 3/00 | (2006.01) |
| H02G 3/00 | (2006.01) |
| B60L 11/18 | (2006.01) |
| B60W 10/26 | (2006.01) |
| B60K 6/28 | (2007.10) |
| B60K 6/46 | (2007.10) |
| B60W 30/192 | (2012.01) |
| B60L 11/12 | (2006.01) |
| B60W 10/06 | (2006.01) |

(52) U.S. Cl.
CPC ............ B60K 6/46 (2013.01); B60L 11/1868 (2013.01); Y02T 10/7022 (2013.01); B60W 10/26 (2013.01); Y02T 10/6278 (2013.01); B60L 1/00 (2013.01); B60K 6/28 (2013.01); B60L 2200/40 (2013.01); B60W 30/192 (2013.01); B60L 11/12 (2013.01); Y02T 10/7066 (2013.01); B60W 10/06 (2013.01); Y02T 10/7077 (2013.01); Y02T 10/7005 (2013.01); Y02T 10/6217 (2013.01); B60Y 2400/114 (2013.01)

USPC .............................. 307/9.1; 307/10.1; 290/31

(58) Field of Classification Search
None
See application file for complete search history.

(56) References Cited

U.S. PATENT DOCUMENTS

| | | | |
|---|---|---|---|
| 4,553,196 A | 11/1985 | Tokuyama et al. | |
| 5,637,978 A * | 6/1997 | Kellett et al. | ................. 320/104 |
| 6,289,180 B1 | 9/2001 | Jeng | |
| 6,292,218 B1 | 9/2001 | Parulski et al. | |
| 6,674,247 B1 | 1/2004 | Mead et al. | |
| 7,047,116 B2 * | 5/2006 | Ishikawa et al. | ................. 701/22 |
| 7,148,658 B2 | 12/2006 | Yu | |
| 7,459,914 B2 | 12/2008 | Lindsey et al. | |
| 7,560,905 B2 | 7/2009 | Lafontaine | |
| 7,764,067 B2 | 7/2010 | Lindsey | |

(Continued)

OTHER PUBLICATIONS

U.S. Appl. No. 12/981,384, filed Dec. 29, 2010.

(Continued)

*Primary Examiner* — Jared Fureman
*Assistant Examiner* — Aqeel Bukhari
(74) *Attorney, Agent, or Firm* — Finnegan, Henderson, Farabow, Garrett & Dunner LLP

(57) ABSTRACT

A power system includes a prime mover drivingly connected to an electric motor/generator. The power system may also include a first electrical energy storage device and a second electrical energy storage device. The power system may further include power-system controls configured to selectively start the prime mover by selectively charging the first electrical energy storage device with electricity from the second electrical energy storage device and transmitting electricity from the first electrical energy storage device to the electric motor/generator to operate the electric motor/generator as an electric motor to start the prime mover.

19 Claims, 3 Drawing Sheets

(56) References Cited

U.S. PATENT DOCUMENTS

| | | |
|---|---|---|
| 2002/0008495 A1* | 1/2002 | Dougherty et al. ........... 320/104 |
| 2009/0001993 A1 | 1/2009 | Lindsey et al. |
| 2009/0033357 A1 | 2/2009 | Lindsey et al. |
| 2009/0071736 A1* | 3/2009 | Mori et al. ............... 180/65.285 |
| 2009/0085575 A1 | 4/2009 | Lindsey et al. |
| 2009/0085759 A1 | 4/2009 | Lindsey et al. |
| 2009/0140745 A1 | 6/2009 | Williams et al. |
| 2009/0140748 A1 | 6/2009 | Lindsey et al. |
| 2009/0219656 A1 | 9/2009 | Lindsey |
| 2009/0251154 A1 | 10/2009 | Lindsey |
| 2009/0309422 A1* | 12/2009 | Helmick ........................ 307/53 |
| 2010/0076636 A1 | 3/2010 | Ichikawa |
| 2010/0155036 A1 | 6/2010 | Andris et al. |

OTHER PUBLICATIONS

U.S. Appl. No. 12/981,398, filed Dec. 29, 2010.

\* cited by examiner

SYSTEM AND METHODS FOR STARTING A PRIME MOVER OF A POWER SYSTEM

TECHNICAL FIELD

The present disclosure relates to power systems with prime movers and, more particularly, starting such prime movers.

BACKGROUND

The power systems of many machines include a prime mover for providing power to perform various tasks with the machines. For example, many machines have an engine as a prime mover, the engine being drivingly connected to an electric motor/generator to generate electricity useable to perform one or more tasks with the machine. The prime mover of a machine is typically shut down when the machine is not in use. When it becomes desired to operate the machine to perform one or more tasks, it may be necessary to start the prime mover. In many cases, starting a prime mover requires driving the prime mover with an external power source until the prime mover can begin operating under its own power.

Many known approaches for starting a prime mover involve using an electric motor to drive the prime mover until it begins operating under its own power. For example, many known systems use an electrical energy storage device, such as a battery, to drive an electric motor to start a prime mover. Unfortunately, if the charge level of the electrical energy storage device is too low, it may not be possible to start the prime mover.

Published U.S. Patent Application No. 2010/0076636 A1 to Ichikawa ("the '636 application") discloses provisions for charging a battery of a machine's power system. The '636 application discloses a power system with an engine drivingly connected to an electric motor/generator. The '636 patent discloses operating the electric motor/generator to start the engine with electricity from an inverter connected to a battery. The system of the '636 application includes a charger that can be connected to a supply of power off-board the machine, such as a commercial supply of 100v or 200v AC power, to charge the battery.

Although the '636 patent discloses a system with a charger that can connect to commercial power off-board the machine to charge a battery, certain disadvantages may persist. For example, in many circumstances, there may not be a readily available source of off-board commercial power to connect to the charger and charge the battery.

The system and methods of the present disclosure solve one or more of the problems set forth above.

SUMMARY

One disclosed embodiment relates to a power system. The power system may include a prime mover drivingly connected to an electric motor/generator. The power system may also include a first electrical energy storage device and a second electrical energy storage device. The power system may further include power-system controls configured to selectively start the prime mover by selectively charging the first electrical energy storage device with electricity from the second electrical energy storage device and transmitting electricity from the first electrical energy storage device to the electric motor/generator to operate the electric motor/generator as an electric motor to start the prime mover.

Another embodiment relates to a method of operating a power system. The power system may include a prime mover drivingly connected to an electric motor/generator, a first electrical energy storage device, and a second electrical energy storage device. The method may include starting the prime mover by selectively charging the first electrical energy storage device with electricity from the second electrical energy storage device and transmitting electricity from the first electrical energy storage device to the electric motor/generator to operate the electric motor/generator as an electric motor to start the prime mover.

A further disclosed embodiment relates to a machine having a chassis and a power system. The power system may include a prime mover drivingly connected to an electric motor/generator, an electric power load, and a power line operable to transmit electricity from the electric motor/generator to the electric power load. The power system may also include a first electrical energy storage device and a second electrical energy storage device. The first electrical energy storage device may be grounded to the chassis, and the second electrical energy storage device may be electrically isolated from the chassis. The power system may also include power-system controls configured to start the prime mover by using energy supplied by the second electrical energy storage device to operate the electric motor/generator as an electric motor to start the prime mover.

DETAILED DESCRIPTION

Figure 1:
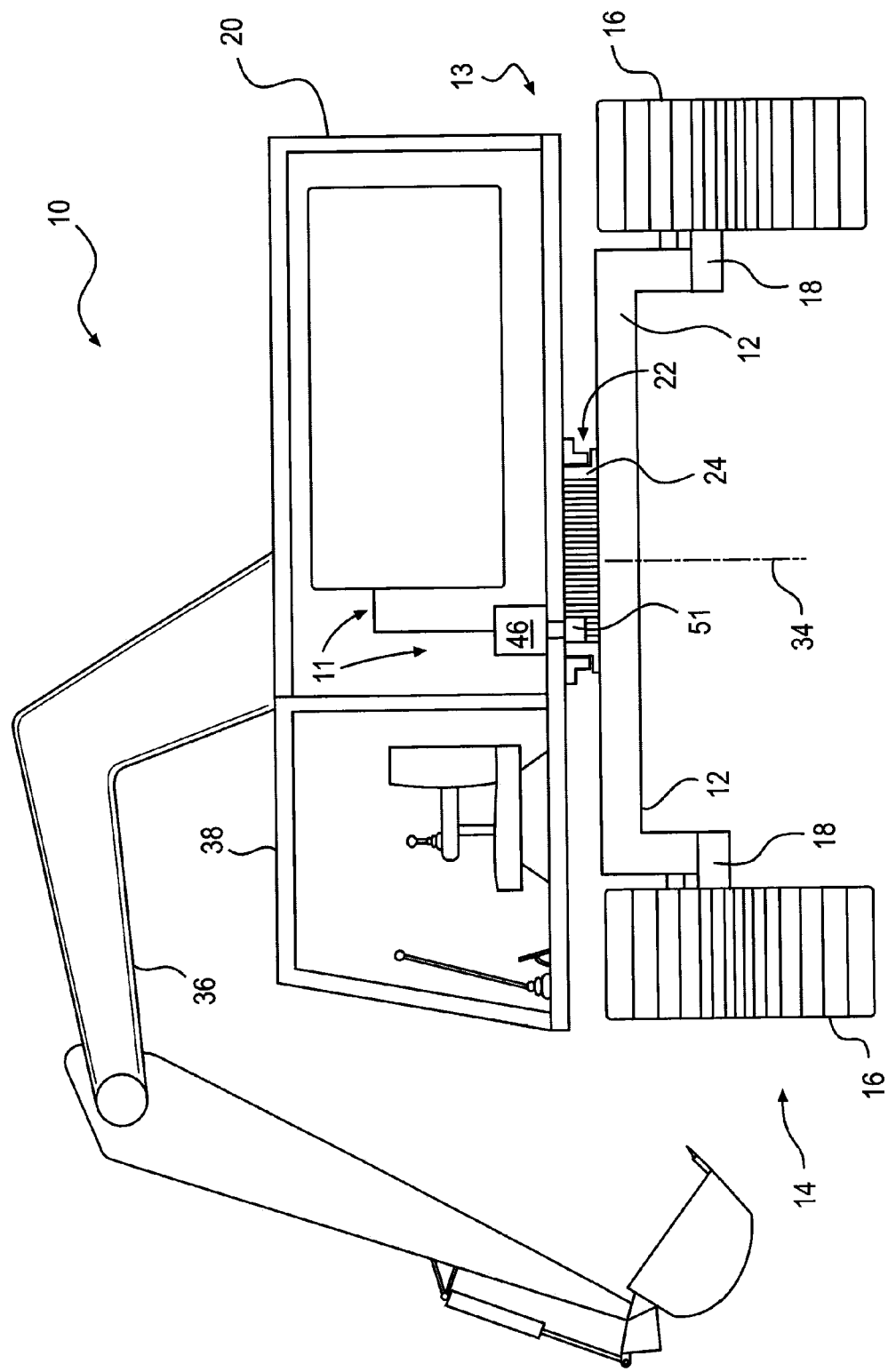
FIG. 1 shows one embodiment of a machine having a power system according to the present disclosure.
Figure 2:
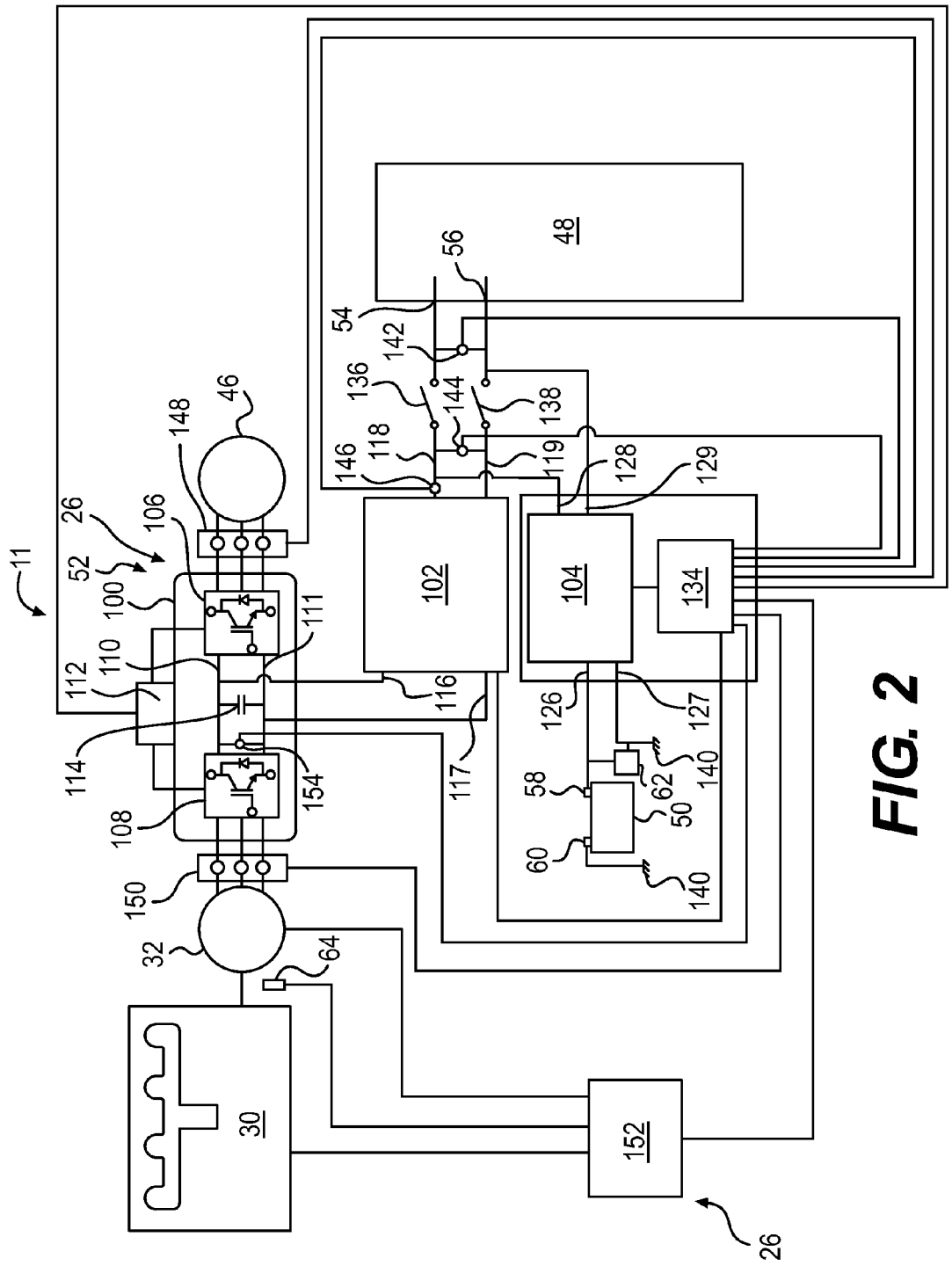
FIG. 2 shows one embodiment of a power system according to the present disclosure in more detail.

FIGS. 1 and 2 show a machine 10, a power system 11, and various components thereof according to the present disclosure. Machine 10 may be any type of machine that employs power to perform one or more tasks. For example, machine 10 may be a mobile machine configured to transport or move people, goods, or other matter or objects. Additionally, or alternatively, machine 10 may be configured to perform a variety of other operations associated with a commercial or industrial pursuit, such as mining, construction, energy exploration and/or generation, manufacturing, transportation, and agriculture.

As shown in FIG. 1, in some embodiments, machine 10 may be an excavator configured for digging. Machine 10 may include a chassis 13 to which other components of machine 10 are attached. In some embodiments, chassis 13 may be constructed in part or in whole from electrically conductive materials, such as steel, cast iron, aluminum, and/or other electrically conductive metals. In the example shown in FIG. 1, chassis 13 may include an undercarriage 14 and a superstructure 20. Undercarriage 14 may include a frame 12. In some embodiments, machine 10 may be a mobile machine, and undercarriage 14 may include one or more propulsion devices 16 for propelling machine 10. Propulsion devices 16 may be any type of device configured to propel machine 10. For example, as FIG. 1 shows, propulsion devices 16 may be track units. Alternatively, propulsion devices 16 may be wheels or other types of devices operable to propel machine 10. Undercarriage 14 may also include one or more components for driving propulsion devices 16. For example, undercarriage 14 may include drive motors 18 for driving propulsion devices 16. Drive motors 18 may be electric motors or hydraulic motors.

Superstructure 20 may be suspended from frame 12. In some embodiments superstructure 20 may be suspended from frame 12 by a pivot system 22. Pivot system 22 may include a swing bearing 24 and an electric motor 46. Swing bearing 24 may include an inner race mounted to frame 12 and an outer race to which superstructure 20 mounts. Both the inner and outer race of swing bearing 24 may extend concentric to a vertical axis 34. The inner and outer race may be engaged to one another via rolling elements (not shown), such as ball bearings, in such a manner that the outer race and superstructure 20 may pivot around axis 34 relative to frame 12.

Electric motor 46 may be operable to rotate superstructure 20 and the outer race of swing bearing 24 around axis 34. Electric motor 46 may have a gear 51 mounted to its output shaft, and electric motor 46 may mount to superstructure 20 in a position such that gear 51 meshes with gear teeth on frame 12. Electric motor 46 may receive power to rotate superstructure 20 around axis 34 from various components of power system 11. Electric motor 46 may constitute one of many electrical power loads of power system 11.

Machine 10 may include various other components. For example, as FIG. 1 shows, machine 10 may include an implement 36. Implement 36 may be mounted to various parts of machine 10 and configured to perform various tasks. In some embodiments, implement 36 may be mounted to superstructure 20 and configured to perform digging. Machine 10 may also include an operator station 38 from which an individual can control one or more aspects of the operation of machine 10. Operator station 38 may also be mounted to superstructure 20.

FIG. 2 shows power system 11 in greater detail. Power system 11 may include power-system controls 26 and various components operable to provide power to perform various tasks. In some embodiments, power system 11 may be a hybrid-electric power system. In addition to power-system controls 26, power system 11 may include electric motor 46, a prime mover 30, an electric motor/generator 32, a first electrical energy storage device 48, a second electrical energy storage device 50, and a power-transmission system 52. As used herein, the term "electric motor/generator" refers to any electrical device operable to operate as an electric motor when receiving electrical power and/or to operate as an electric generator when being mechanically driven.

Prime mover 30 may be any type of device configured to produce mechanical power to drive electric motor/generator 32. For example, prime mover 30 may be a diesel engine, a gasoline engine, a gaseous fuel-powered engine, or any other type of component operable to produce mechanical power.

Electric motor/generator 32 may be any type of component operable to generate electricity with mechanical power received from prime mover 30. Electric motor/generator 32 may also be operable to receive electricity and operate as an electric motor to drive prime mover 30 for a number of purposes. Electric motor 46 may be any type of component operable to receive electricity from power-transmission system 52 and operate as an electric motor. Each of electric motor/generator 32 and electric motor 46 may be, for example, any of a permanent-magnet electric machine, a switched reluctance electric machine, a DC electric machine, an induction-type machine or any other type of electric machine known in the art.

Electrical energy storage device 48 may be any type of device operable to store electrical energy and exchange electricity with (i.e., receive electricity from and transmit electricity to) power-transmission system 52. For example, electrical energy storage device 48 may include one or more batteries and/or one or more capacitors. Electrical energy storage device 48 may include a positive terminal 54 and a negative terminal 56. Electrical energy storage device 48 may be electrically isolated from the chassis 13 of machine 13. Electrical energy storage device 48 may include one or more storage cells (not shown) electrically connected to positive and negative terminals 54, 56. In some embodiments, electrical energy storage device 48 may include multiple storage cells electrically connected in series and/or parallel to positive and negative terminals 54, 56.

Electrical energy storage device 48 may also include various other electrical components connected to terminals 54, 56 and/or the storage cells. For example, in some embodiments where electrical energy storage device 48 includes multiple energy storage cells connected to one another, electrical energy storage device 48 may include one or more circuits for allowing the flow of electricity around one or more cells during charging and/or discharging of electrical energy storage device 48. These and other components of electrical energy storage device 48 may be able to carry only limited current in certain circumstances, such as during charging of electrical energy storage device 48 in order to balance the charge of the cells in circumstances where the relative charge levels of its storage cells has become imbalanced.

Electrical energy storage device 48 may serve as the primary electrical energy storage for power system 11. Accordingly, electrical energy storage device 48 may have a large energy storage capacity. Additionally, electrical energy storage device 48 may have a relatively high nominal voltage rating, such as approximately 350 volts.

Electrical energy storage device 50 may also be any type of device operable to store electrical energy and exchange electricity with (i.e., receive electricity from and transmit electricity to) power-transmission system 52. Like electrical energy storage device 48, electrical energy storage device 50 may include one or more batteries and/or one or more capacitors. Electrical energy storage device 50 may include a positive terminal 58 and a negative terminal 60. In some embodiments, one of terminals 58, 60 may be electrically connected to chassis 13, so that the voltage of the terminal 58, 60 is chassis referenced. For example, negative terminal 60 may be electrically connected to chassis 13 via an electrical ground 140. Electrical energy storage device 50 may serve as a secondary electrical energy store of power system 11. Additionally, electrical energy storage device 50 may have a significantly lower nominal voltage rating than energy storage device 48. For example, electrical energy storage device 50 may have a nominal voltage rating of approximately 12 volts or approximately 24 volts.

Power-transmission system 52 may include an inverter 100, a power regulator 102, a power regulator 104, and various electrical connectors, such as electric lines and/or electric switches connecting these devices. Inverter may 100 include a power electronics unit 106, a power electronics unit 108, power lines 110, 111, a bulk capacitor 114, and a controller 112. Power electronics unit 106 may be operable to regulate a flow of power between electric motor 46 and power lines 110, 111. Power electronics module 106 may also be operable to convert the form of electricity flowing between electric motor 46 and power lines 110, 111. For example, power electronics unit 106 may be operable to convert between alternating electric current at electric motor 46 and direct current at power lines 110, 111. Power electronics module 108 may similarly be operable to regulate a flow of power between electric motor/generator 32 and power lines 110, 111. Power electronics module 108 may also be able to convert the form of electricity flowing between electric motor/generator 32 and power lines 110, 111, such as converting between alternating current electricity at electric motor/generator 32 and direct current electricity at power lines 110, 111. Power electronics modules 106-108 may include various types of controllable electric components for regulating and/or converting electrical power, including, but not limited to SCRs (sillicon controller rectifiers), GTOs (gate turn-offs), IGBTs (insulated gate bipolar transistors), and FETs (field-effect transistors). Bulk capacitor 114 may be connected between power lines 110, 111 and serve to smooth out any fluctuations in voltage across power lines 110, 111. This configuration of inverter 100 may allow exchange of electricity between electric motor/generator 32 and electric motor 46 via power electronics modules 106, 108 and power lines 110, 111.

Controller 112 may be operatively connected to power electronics modules 106, 108, and controller 112 may be configured (e.g., programmed) to control one or more aspects of the operation of power electronics modules 106, 108. In some embodiments, controller 112 may include, for example, one or more microprocessors and/or one or more memory devices. By controlling power electronics modules 106, 108, controller 112 may be operable to control the voltage on power lines 110, 111, as well as the magnitude of current flowing between power lines 110, 111, electric motor 46, and electric motor/generator 32. In some embodiments, controller 112 may control power electronics modules to maintain voltage on power lines 110, 111 higher than the nominal voltage rating of electrical energy storage device 48. For example, where the nominal voltage rating of electrical energy storage device 48 is about 350 volts, controller 112 may operate power electronics modules 106, 108 to maintain the voltage on power lines at about 650 volts.

Power regulator 102 may include input/output terminals 116, 117, 118, 119. Power regulator 102 may have any configuration that allows it to regulate one or more aspects of electricity exchanged between terminals 116, 117 and terminals 118, 119. Power regulator 102 may, for example, be operable to control whether electricity is exchanged between terminals 116, 117 and terminals 118, 119. Power regulator 102 may also be configured to control which direction electricity flows between terminals 116, 117 and terminals 118, 119, i.e., whether electricity flows from terminals 116, 117 to terminals 118, 119, or vice-a-versa. Power regulator 102 may exchange electricity in various forms. In some embodiments, power regulator 102 may be configured to receive and/or supply direct current electricity at terminals 116, 117, 118, 119. Power regulator 102 may also be operable to control the voltage at each of terminals 116, 117, 118, 119 as well as the magnitude of electric current flowing at each of terminals 116, 117, 118, 119. For example, power regulator 102 may be operable to change the electricity transmitted between terminals 116, 117 and terminals 118, 119 from one voltage (such as approximately 650 volts) of direct current electricity at terminals 116, 117 to another voltage (such as approximately 350 volts) of direct current electricity at terminals 118, 119. As discussed further below, power regulator 102 may be controllable by one or more other component(s) of power system 11, so that those other components may control how power regulator 102 controls the exchange of electricity between terminals 116, 117 and terminals 118, 119. Power regulator 102 may include any suitable configuration of components that allows it to provide the above-discussed functionality.

Power regulator 104 may include input/output terminals 126, 127, 128, 129. Power regulator 104 may have any configuration that allows it to regulate one or more aspects of electricity exchanged between terminals 126, 127 and terminals 128, 129. Power regulator 104 may, for example, be operable to control whether electricity is exchanged between terminals 126, 127 and terminals 128, 129. Power regulator 104 may exchange electricity in various forms. In some embodiments, power regulator 104 may be configured to receive and/or supply direct current electricity at terminals 126, 127, 128, 129. Power regulator 104 may also be operable to control the voltage at each of terminals 126, 127, 128, 129 as well as the magnitude of electric current flowing at each of terminals 126, 127, 128, 129. For example, power regulator 104 may be operable to change the electricity transmitted between terminals 126, 127 and terminals 128, 129 from one voltage (such as approximately 12 or 24 volts) of direct current electricity at terminals 126, 127 to another voltage (such as approximately 350 volts) of direct current electricity at terminals 128, 129.

Power regulator 104 may be a unidirectional or bidirectional power regulator. In embodiments where power regulator 104 is a unidirectional power regulator, power regulator 104 may be operable to transmit electricity in only one direction between terminals 126, 127 and terminals 128, 129. For example, in some embodiments, power regulator 104 may be operable to transmit electricity from terminals 126, 127 to terminals 128, 129 but not in the opposite direction. Conversely, in embodiments where power regulator 104 is a bidirectional power regulator, power regulator 104 may be configured to control which direction electricity flows between terminals 126, 127 and terminals 128, 129, i.e., whether electricity flows from terminals 116, 117 to terminals 118, 119, or vice-a-versa.

Power regulator 104 may include a controller 134 configured (e.g., programmed) to control the foregoing aspects of how power regulator 104 controls the exchange of electricity between its terminals 126, 127, 128, 129. Controller 134 may have any configuration allowing it to perform such control of power regulator 104. In some embodiments, controller 134 may include one or more microprocessors and/or one or more memory devices. Controller 134 may also be operatively connected to power regulator 102 and controller 112 of inverter 100, so that controller 134 may monitor and/or control one or more aspects of the operation of power regulator 102 and inverter 100. As discussed further below, controller 134 and power regulator 104 may be operatively connected to other components of power-system controls 26, so that those other components may provide information to and/or control one or more aspects of how controller 134 controls power regulator 104, power regulator 102, and inverter 100. Power regulator 104 may include any suitable configuration of components that allows it to provide the above-discussed functionality.

In some embodiments, power regulator 104 may be operable to control small quantities of electric current more precisely than power regulator 102. For example, power regulator 104 may be operable to provide stable, effective control of the current magnitude and voltage of electric currents measured in milliamps, whereas power regulator 102 may be configured to control much larger power levels, such as electric current magnitudes in the tens or hundreds of amps. Concomitantly, power regulator 102 may, in some embodiments, have a higher power capacity than power regulator 104. For example, power regulator 102 may have a power capacity of tens, hundreds, or thousands of times that of power regulator 104.

Inverter 100, power regulators 102, 104, electrical energy storage devices 48, 50, electric motor 46, and electric motor/generator 32 may be electrically connected to one another in various ways. As FIG. 2 shows, in some embodiments, terminals 116, 117 of power regulator 102 may be electrically connected to power lines 110, 111 of inverter 100. This may allow exchange of electricity between power regulator 102, electric motor 46, and electric motor/generator 32 via power lines 110, 111 of inverter 100.

Additionally, power-transmission system 52 may have provisions for connecting terminals 118, 119 of power regulator 102 directly or indirectly to each of power regulator 104, electrical energy storage device 48, and electrical energy storage device 50. Terminal 118 of power regulator 102 may, for example, be continuously electrically connected to terminal 128 of power regulator 104. Additionally, power-transmission system 52 may include a switching device 138 that is operable when closed to electrically connect terminal 119 of power regulator 102 to terminal 129 of power regulator 104. Thus, when switching device 138 is in the closed operating state such that terminals 118, 119 of power regulator 102 are electrically connected to terminals 128, 129 of power regulator 104, power regulators 102, 104 may exchange electricity between one another, and power regulator 102 may be indirectly connected to electrical energy storage device 50 through power regulator 104. Conversely, when switching device 138 is in its open operating state, power regulator 102 and power regulator 104 may be effectively electrically isolated from one another.

Switching device 138 may also be operable to electrically connect terminal 119 of power regulator 102 to negative terminal 56 of electrical energy storage device 48. Additionally, power-transmission system 52 may include a switching device 136 operable when in its closed operating state to electrically connect terminal 118 of power regulator 102 to positive terminal 54 of electrical energy storage device 48. Thus, when switching devices 136, 138 are in their closed operating states, power regulator 102 and electrical energy storage device 48 may exchange electricity between one another. Conversely, when either of switching devices 136, 138 is in an open operating state, electrical energy storage device 48 may be effectively electrically isolated from power regulator 102. Switching devices 136, 138 may be controlled by various other components of power-system controls 26. In some embodiments, switching devices 136, 138 may be controlled, for example, by controller 134.

Power-transmission system 52 may also be configured to allow exchange of electricity between power regulator 104 and electrical energy storage device 48. Terminal 129 of power regulator 104 may, for example, be continuously electrically connected to negative terminal 56 of electrical energy storage device 48. Additionally, as noted above, terminal 128 of power regulator 104 may be continuously electrically connected to terminal 118 of power regulator 102, and switching device 136 may be operable when in a closed operating state to electrically connect terminal 118 of power regulator 102 to positive terminal 54 of electrical energy storage device 48. Thus, when switching device 136 is in a closed operating state, power regulator 104 and electrical energy storage device 48 may exchange electricity between one another. Conversely, when switching device 136 is in an open operating state, power regulator 104 and electrical energy storage device 48 may be effectively electrically isolated from one another.

Power-transmission system 52 may also have provisions for transmitting electricity between electrical energy storage device 50 and power regulator 104. For example, terminal 126 of power regulator 104 may be continuously connected to positive terminal 58 of electrical energy storage device 50. Additionally, negative terminal 60 of electrical energy storage device 50 and terminal 127 of power regulator 104 may be electrically connected to a common electrical ground, 140, such as an electrically conductive portion of chassis 13 of machine 10.

The exemplary configuration of power-transmission system 52 shown in FIG. 2 may allow it to transmit electricity between electric motor/generator 32, electric motor 46, electrical energy storage device 48, and electrical energy storage device 50 in various ways through power regulators 102, 104. For example, when switching device 136 is in a closed operating state and switching device 138 is in an open operating state, power-transmission system 52 may transmit electricity between electrical energy storage device 50 and electrical energy storage device 48 via power regulator 104. When switching device 136 is in an open operating state and switching device 138 is in a closed operating state, power-transmission system 52 may transmit electricity between electrical energy storage device 50, electric motor/generator 32, and electric motor 46 via power regulators 102, 104. When both switching devices 136, 138 are closed, power-transmission system 52 may freely exchange electricity between electrical energy storage device 48, electrical energy storage device 50, electric motor/generator 32, and electric motor 46 through one or both of power regulators 102, 104.

In addition to those shown in FIG. 2, power system 11 may also include a number of other electrical loads and/or sources. For example, in addition to electric motor 46, power system 11 may include various other large, high-voltage electrical loads, such as drive motors 18, connected to power lines 110, 111 of inverter 100. Additionally, power system 11 may have various electrical loads 62 connected to electrical energy storage device 50, which may be smaller, low-voltage loads, such as lights, gauges, sensors, fan motors, and the like. Such loads 62 may be connected to electrical energy storage device 50 through a low-voltage power-transmission system, separate from power-transmission system 52. Additionally, power system 11 may include one or more electricity sources for charging electrical energy storage device 50 and/or powering any smaller, low-voltage loads connected thereto. For example, power system 11 may include a conventional alternator (not shown) driven by prime mover 30. Electrical power loads 62, the low-voltage power-transmission system connecting them to electrical energy storage device 50, and any other electrical energy sources connected to electrical energy storage device 50 and electrical power loads 62 may be electrically referenced to chassis 13, such as by connection to ground 140.

Power-system controls 26 may be configured to control charging and discharging of electrical storage devices 48, 50, operation of prime mover 30, operation of electric motor/generator 32, operation of electric motor 46, and transmission of electricity through power-transfer system 52 in connection with all of these tasks. Power-system controls 26 may include a number of the components already discussed, such as inverter 100, power regulator 102, power regulator 104, and switching devices 136, 138. To control the operation of these components, some embodiments of power-system controls 26 may include one or more other components. For example, as FIG. 2 shows, power-system controls 26 may include a controller 152 operably connected to controller 134 of power regulator 104. Controller 152 may also be operatively connected to prime mover 30, electric motor/generator 32, and electric motor 46 in a manner allowing controller 152 to monitor and/or control one or more aspects of the operation of these components. Based on various operating parameters of prime mover 30, electric motor/generator 32, electric motor 46, and/or other components of power system 11, controller 152 may perform high-level control of power system 11. In doing so, controller 152 may provide to controller 134 of power regulator 104 various target values for operation of power regulator 104, power regulator 102, inverter 100, the primary electrical energy storage device 48, the secondary electrical energy storage device 50, and/or other components of power system 11. For example, controller 152 may communicate to controller 134 target values for voltage and/or electric current in certain portions of power system 11, and controller 134 may control power regulator 104, power regulator 102, inverter 100, switching devices 136, 138 and/or other components of power system 11 to implement the target values. Controller 152 may include any suitable information processing device for controlling the components discussed above. In some embodiments, controller 152 may include one or more microprocessors and/or one or more memory devices programmed to control power system 11 in the manners discussed below.

Power-system controls 26 may also include components for monitoring various aspects of the operation of power system 11. For example, power-system controls 26 may include a voltage sensor 142 for sensing a voltage across terminals 54, 56 of electrical energy storage device 48, which may serve as an indication of a charge level of electrical energy storage device 48. Power-system controls 26 may also include a voltage sensor 144 for sensing a voltage across terminals 118, 119 of power regulator 102. Similarly, power-system controls 26 may include a voltage sensor 154 for sensing the voltage between power lines 110, 111. Additionally, power-system controls 26 may also include a current sensor for sensing a magnitude of electric current in terminal 118, current sensors 148 for sensing a magnitude of electric current flowing between inverter 100 and electric motor 46, and current sensors 150 for sensing a magnitude of electric current flowing between inverter 100 and electric motor/generator 32.

Power-system controls 26 may also include a position sensor 64 for sensing a rotational position of a shaft of electric motor/generator 32. Position sensor 64 may be any type of sensor operable to sense the position of the shaft of electric motor/generator 32. In some embodiments, position sensor 64 may be of a type such that the rotational position of the shaft of electric motor/generator 32 can be discerned from the signal generated by position sensor 64 only when the shaft of electric motor/generator 32 is rotated.

The sensors of power-system controls 26 may be communicatively linked to various components. For example, these sensors may be communicatively linked to controller 134 and/or controller 152, so that power-system controls 26 may monitor the parameters sensed by these sensors. Additionally, power-system controls 26 may include sensors for sensing various other aspects of the operation of power system 11, such as whether prime mover 30 is driving electric motor/generator 32 and whether electric motor/generator 32 is generating electricity. Controller 134 and/or controller 152 and/or other components of power-system controls 26 may also monitor these operating parameters.

Electrical energy storage device 48 and electrical energy storage device 50 may form part of two different branches or circuits of power system 11. As noted above, electrical energy storage device 48 may be electrically isolated from chassis 13 of machine 10, and electrical energy storage device 50 may be electrically referenced to chassis 13 by its connection to chassis 13 at ground 140. As also noted above, power loads 62 and various other electrical components connected to electrical energy storage device 50 may be electrically referenced to chassis 13 of machine 10, such as by connection to ground 140. On the other hand, like electrical energy storage device 48, power regulator 102, inverter 100, power lines 110, 111, electric motor/generator 32, and electric motor 46 may be electrically isolated from chassis 13 and, thus, from electrical energy storage device 50, electrical loads 62, and other chassis referenced electrical components. Thus, electrical energy storage device 50, electrical power loads 62, and other chassis referenced components may form part of one branch or circuit of power system 11, whereas electrical energy storage device 48, power regulator 102, inverter 100, power lines 110, 111, electric motor/generator 32, and electric motor 46 may form part of a separate electrically isolated branch or circuit of power system 11. As noted above, in some embodiments, the branch or circuit containing electrical energy storage device 50 may be a low-voltage branch or circuit, and the branch or circuit containing electrical energy storage device 48 may be a high-voltage branch or circuit. Power regulator 104 may serve as a bridge between the chassis referenced branch or circuit containing electrical energy storage device 50 and the other branch or circuit containing electrical energy storage device 48.

Machine 10 and power system 11 are not limited to the configurations shown in FIGS. 1 and 2 and discussed above. For example, the control tasks handled by power-system controls 26 may be distributed differently between controllers 112, 134, and 152 than discussed above. Additionally, power-system controls 26 may include various other configurations and/or arrangements for controlling the transmission of electricity between the various components of power system 11. Such other configurations of power-system controls 26 may include additional control components communicatively linked to one another and operable to share control tasks, such as other controllers, in addition to controllers 112, 134, and 152. Conversely, in some embodiments, power-system controls 26 may have a single controller in place of two or more of controllers 112, 134, and 152. Additionally, power-system controls 26 may include other numbers and/or configurations of power regulators, switching devices, and other components that transmit power between the power loads and power sources of power system 11. Power system 11 may also include different numbers and/or configurations of electrical energy storage devices than the examples discussed above. Additionally, electric motor 46 may serve a function other than rotating superstructure 20 around axis 34, such as moving other components of machine 10 or supplying mechanical power to propel machine 10. Furthermore, machine 10 may be any of a number of types of machines other than an excavator, including a stationary machine.

INDUSTRIAL APPLICABILITY

Machine 10 and power system 11 may have use in any application requiring power to perform one or more tasks. During operation of machine 10, power-system controls 26 may activate various electric loads to perform various tasks, such as activating electric motor 46 to rotate superstructure 20 around axis 34. Power system 11 may provide the electricity required to operate electric motor 46 and any other electric loads from various sources in various situations. Depending on the circumstances, power system 11 may provide electricity to electric motor 46 and the other electric loads from one or more of electric motor/generator 32, primary electric energy storage device 48, and/or secondary electric energy storage device 50.

In many circumstances, it may become desirable to provide power with prime mover 30 when prime mover 30 is shut down. In such circumstances, power-system controls 26 may start prime mover 30. Starting prime mover 30 may require driving prime mover 30 with an external power source until prime mover 30 begins operating under its own power. Power-system controls 26 may use various external power sources to drive prime mover 30 in order to start it. In some embodiments, power-system controls 26 may operate electric motor/generator 32 as an electric motor to drive prime mover 30 with electrical energy from primary electrical energy storage device 48 and/or secondary electrical energy storage device 50. Power-system controls 26 may use various approaches to do so.

Figure 3:
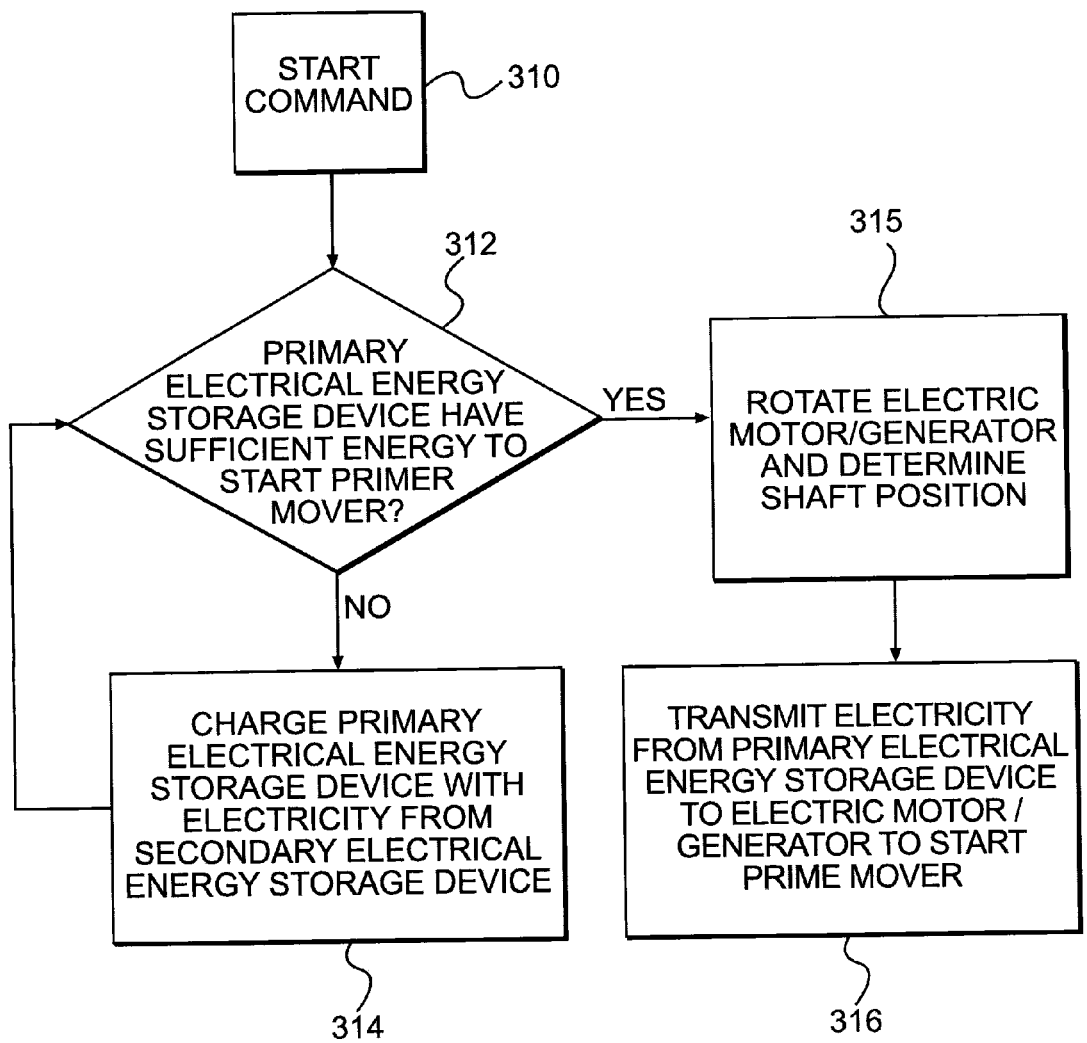
FIG. 3 is a flow chart illustrating one exemplary method of operating a power system according to the present disclosure.

FIG. 3 illustrates one method by which power-system controls 26 may start prime mover 30 with electric motor/generator 32 and electricity from one or both of electrical energy storage devices 48, 50. The process of starting prime mover 30 may be initiated when a command to start the prime mover 30 is generated (step 310). The start command may be generated in various ways by various entities. For example, the start command may be generated automatically by power-system controls 26 in response to various operating conditions, or the start command may be received by power-system controls 26 from an operator of machine 10 or one or more off-board control components.

In response to the start command, power-system controls 26 may determine whether primary electrical energy storage device 48 has sufficient energy to operate electric motor/generator 32 as an electric motor to drive prime mover 30 long enough to start it (step 312). Power-system controls 26 may use various approaches to evaluate whether primary electrical energy storage device 48 has sufficient energy to start prime mover 30. In some embodiments, power-system controls 26 may evaluate the energy level of the primary electrical energy storage device 48 by using the signal from voltage sensor 142 indicating the voltage at terminals 54, 56 of the primary electrical energy storage device 48. For example, power-system controls 26 may compare the sensed voltage level at terminals 54, 56 of the primary electrical energy storage device 48 to a reference value to determine whether the primary electrical energy storage device 48 has sufficient energy to start prime mover 30.

If power-system controls 26 determine that the primary electrical energy storage device 48 has insufficient energy to start prime mover 30, power-system controls 26 may begin charging the primary electrical energy storage device 48 with electricity from the secondary electrical energy storage device 50 (step 314). To do so, power-system controls 26 may control switching device 136 to its closed operating state, so that terminals 128, 129 of power regulator 104 are electrically connected to terminals 54, 56 of the primary electrical energy storage device 48. With power regulator 104 so connected to the primary electrical energy storage device 48, power-system controls 26 may control power regulator 104 to receive electricity from the secondary electrical energy storage device 50 and transmit electricity to the primary electrical energy storage device 48. Power regulator 104 may receive electricity from the secondary electrical energy storage device 50 at one voltage and supply electricity to the primary electrical energy storage device 48 at another voltage. For example, power regulator 104 may receive electricity from the secondary electrical energy storage device 50 at approximately 12 or 24 volts, and power regulator 104 may supply electricity to the primary electrical energy storage device 48 at a higher voltage, such as approximately 350 volts.

While charging the primary electrical energy storage device 48 with electricity from the secondary electrical energy storage device 50, power-system controls 26 may repeatedly reevaluate whether the primary electrical energy storage device 48 has sufficient energy to start prime mover 30 (step 312). Once power-system controls 26 determine that the primary electrical energy storage device 48 has sufficient energy to start prime mover 30, power-system controls 26 may begin a process of starting prime mover 30 with electricity from the primary electrical energy storage device 48. This may involve controlling switching devices 136, 138 to their closed operating states, so that the primary electrical energy storage device 48 is electrically connected to power lines 110, 111 via power regulator 102.

With the primary electrical energy storage device 48 charged and connected to power lines 110, 111, power-system controls 26 may execute varies steps to start prime mover 30 with electricity from the primary electrical energy storage device 48. In some embodiments, power-system controls 26 may need to know the rotational position of the shaft of electric motor/generator 32 in order to properly control the supply of electricity to electric motor/generator 32 to drive prime mover 30. Additionally, as noted above, some embodiments may have a type of position sensor 64 that requires movement of the shaft of electric motor/generator 32 to ascertain its rotational position. Accordingly, as part of the process of starting prime mover 30, power-system controls 26 may rotate the shaft of electric motor/generator 32 enough to ascertain its rotational position with the signal from position sensor 64 (step 315). Power-system controls 26 may do so in various ways. In some embodiments, power-system controls 26 may charge bulk capacitor 114 to a target voltage level and control power electronics module 108 to transmit a pulse of electricity from bulk capacitor 114 to electric motor/generator 32 to rotate its shaft enough to ascertain its rotational position. Power-system controls 26 may also execute various other preparatory steps before beginning to drive prime mover 30 to start it.

Once any such preparatory steps are completed, power-system controls 26 may transmit electricity from the primary electrical energy storage device 48 to electric motor/generator 32 to operate electric motor/generator 32 as an electric motor to drive prime mover 30 (step 316). This may involve power regulator 102 receiving electricity from the primary electrical energy storage device 48 and transmitting electricity to power lines 110, 111. Power electronics module 108 may relay the electricity from power lines 110, 111 to electric motor/generator 32. Power regulator 102 may receive electricity from the primary electrical energy storage device 48 at one voltage and supply electricity to power lines 110, 111 at another voltage. For example, power regulator 102 may receive electricity from the primary electrical energy storage device 48 at approximately 350 volts and supply electricity to power lines 110, 111 at approximately 650 volts.

Power electronics module 108 may supply electricity to electric motor/generator 32 in various forms, and power electronics module 108 may control the electricity supplied to electric motor/generator 32 based on various operating parameters. In some embodiments, power electronics module 108 may convert the electricity from DC electricity at power lines 110, 111 to multiphase alternating electric current supplied to electric motor/generator 32. Additionally, power electronics module 108 may control one or more aspects of the electricity supplied to electric motor/generator 32, such as the timing of the various phases of electricity, based on the determined rotational position of the shaft of electric motor/generator 32.

Once prime mover 30 starts operating under its own power, the starting process shown in FIG. 3 may end. Then, with prime mover 30 driving electric motor/generator 32, power-system controls 26 may begin controlling electric motor/generator 32 to operate as an electric generator supplying electricity to power lines 110, 111. Power-system controls 26 may operate power electronics module 108 to control the electricity supplied to power lines 110, 111 by electric motor/generator 32 in various ways. In some embodiments, power electronics module 108 may control the electricity supplied to power lines 110, 111 to be DC electricity at approximately 650 volts. Power-system controls 26 may control various other components to use this electricity supplied to power lines 110, 111 to perform various tasks. For example, power-system controls 26 may control electric motor 46 and/or other high voltage loads connected to power lines 110, 111 to operate on electricity supplied to power lines 110, 111 by electric motor/generator 32.

During such operation, power-system controls 26 may rely on the primary electrical energy storage device 48 to absorb fluctuations in the electricity requirements of electric motor 46 and other large, high-voltage loads connected to power lines 110, 111. This may involve controlling power regulator 102 to transmit electricity from the primary electrical energy storage device 48 to power lines 110, 111 when the power requirements of electric motor 46 and/or other electric components connected to power lines 110, 111 are high. Conversely, when the power requirements of electric motor 46 and/or other electric power loads connected to power lines 110, 111 are low, power regulator 102 may transmit electricity supplied to power lines 110, 111 by electric motor/generator 32 to the primary electrical energy storage device 48 to charge it. Power regulator 102 may control the electricity transmitted between power lines 110, 111 and the primary electrical energy storage device 48 in various ways. In some embodiments, power regulator 102 may convert the transmitted electricity from one voltage at the primary electrical energy storage device 48 to another voltage at power lines 110, 111. For example, power regulator 102 may convert from approximately 350 volts at the primary electrical energy storage device 48 to approximately 650 volts at power lines 110, 111.

While electric motor/generator 32 and/or the primary electrical energy storage device 48 are supplying electricity to power lines 110, 111 to power electric motor 46 and/or other high-voltage electrical power loads, the secondary electrical energy storage device 50 may supply electricity to other power loads of power system 11. For example, the secondary electrical energy storage device 50 may supply electricity to power loads 62. The secondary electrical energy storage device 50 may supply this electricity at a different voltage than the electricity supplied to power lines 110, 111. For example, whereas power lines 110, 111 may carry electricity at approximately 650 volts, the secondary electrical energy storage device 50 may supply electricity to power loads 62 at a lower voltage, such as approximately 12 or 24 volts.

Operation of power system 11 is not limited to the examples discussed in this disclosure and shown in FIG. 3. For instance, power-system controls 26 may omit one or more of the actions discussed above and/or shown in FIG. 3. In some embodiments, power-system controls 26 may omit the action of briefly rotating electric motor/generator 32 to determine the position of its shaft before beginning to operate electric motor/generator 32 to drive prime mover 30 and start it.

Furthermore, power-system controls 26 may execute various other actions in addition to those discussed above and shown in FIG. 3. For example, in connection with the process shown in FIG. 3 of starting prime mover 30, power-system controls 26 may communicate information about the status of the starting process to an operator of machine 10. If the start command (step 310) that triggers the process came from an operator, the operator may tend to expect prime mover 30 to start without delay. Accordingly, if power-system controls 26 determine to first charge the primary electrical energy storage device 48, power-system controls 26 may communicate to the operator that the prime mover 30 will be started after some delay.

Power-system controls 26 may also use approaches other than those discussed above for starting prime mover 30 with electricity from the secondary electrical energy storage device 50. According to the approach shown in FIG. 3, power-system controls 26 sometimes start prime mover 30 with electricity from the secondary electrical energy storage device by transmitting the electricity to the primary electrical energy storage device 48 and then starting the prime mover 30 with that electricity. In some embodiments, power-system controls 26 may, instead, transmit electricity from the secondary electrical energy storage device 50 to power lines 110, 111 without transmitting the electricity to the primary electrical energy storage device 48. To do so, power-system controls 26 may control switching device 138 to its closed operating state and switching device 136 to its open operating state. This may electrically connect power regulator 102 to power regulator 104, while electrically isolating the primary electrical energy storage device 48 from power regulator 104.

With the components of power system 11 connected in this manner, power-system controls 26 may operate power regulators 102, 104 to transmit electricity from the secondary electrical energy storage device 50 to power regulator 102, and from power regulator 102 to power lines 110, 111. Simultaneously, power-system controls 26 may operate power electronics module 108 to transmit the electricity to electric motor/generator 32 to operate it as an electric motor to start prime mover 30. Power regulators 102, 104 and power electronics module 108 may control the electricity transmitted from the secondary electrical energy storage device 50 in various ways as it flows to electric motor/generator 32. In some embodiments, power regulator 104 may receive electricity from the secondary electrical energy storage device 50 at one voltage and supply the electricity to power regulator 102 at another voltage. For example, power regulator 104 may receive electricity from the secondary electrical energy storage device 50 at approximately 12 or 24 volts and supply the electricity to power regulator 102 at approximately 350 volts. Power regulator 102 may similarly supply electricity to power lines 110, 111 at a different voltage than that it receives. For example, power regulator 102 may supply the electricity to power lines 110, 111 at approximately 650 volts. Embodiments of power system 11 where power regulator 104 has a relatively high power capacity may be particularly well suited for the above-discussed approach of transmitting electricity to electric motor/generator 32 without first transmitting the electricity to the primary electrical energy storage device 48.

Power-system controls 26 may control the transmission of electricity in power system 11 in various ways different from those discussed above. For instance, power-system controls 26 may control the voltage at various points in power system 11 to different values than the examples discussed above. Additionally, power-system controls 26 may control the form of the electricity differently at various points in power system 11. For example, power-system controls 26 may control the electricity carried on power lines 110, 111 to be alternating current electricity, instead of direct current electricity.

The disclosed embodiments may provide certain advantages. For example, using electricity from the secondary electrical energy storage device 50 to start prime mover 30 may allow starting prime mover 30 when the primary electrical energy storage device 48 has insufficient energy to do so, even if no off-board source of electricity is readily available. This may significantly increase the availability of machine 10.

It will be apparent to those skilled in the art that various modifications and variations can be made in the disclosed system and methods without departing from the scope of the disclosure. Other embodiments of the disclosed system and methods will be apparent to those skilled in the art from consideration of the specification and practice of the system and methods disclosed herein. It is intended that the specification and examples be considered as exemplary only, with a true scope of the disclosure being indicated by the following claims and their equivalents.

What is claimed is:

1. A power system, comprising:
    a prime mover drivingly connected to an electric motor/generator;
    a first electrical energy storage device;
    a second electrical energy storage device;
    a first power regulator;
    a second power regulator; and
    power-system controls configured to selectively start the prime mover by
        selectively charging the first electrical energy storage device with electricity from the second electrical energy storage device by receiving electricity from the second electrical energy storage device at the first power regulator and supplying electricity from the first power regulator to the first electrical energy storage device; and
        transmitting electricity from the first electrical energy storage device to the electric motor/generator via the second power regulator to operate the electric motor/generator as an electric motor to start the prime mover.

2. The power system of claim 1, wherein:
    the power system is part of a machine having a chassis,
    the second electrical energy storage device is grounded to the chassis; and
    the first electrical energy storage device is electrically isolated from the chassis.

3. The power system of claim 1, wherein:
    the power-system controls include a power regulator connected between the first electrical energy storage device and the second electrical energy storage device; and
    charging the first electrical energy storage device with electricity from the second electrical energy storage device includes
        transmitting electricity from the second electrical energy storage device to the power regulator at a first voltage, and
        transmitting electricity from the power regulator to the first electrical energy storage device at a second voltage.

4. The power system of claim 3, wherein the second voltage is higher than the first voltage.

5. The power system of claim 1, wherein the power-system controls are further operable to transmit electricity to one or more electric power loads of the power system, including
    after starting the prime mover, selectively transmitting power from the electric motor/generator and the first electrical energy storage device to a first electric power load at a first voltage; and
    selectively transmitting power from the second electrical energy storage device to a second electric power load at a second voltage.

6. The power system of claim 5, wherein the first voltage is higher than the second voltage.

7. The power system of claim 1, wherein:
    the power-system controls include a position sensor for determining a rotational position of a shaft of the electric motor/generator; and
    the power-system controls are further configured to determine the rotational position of the shaft of the motor/generator prior to starting the prime mover by transmitting a pulse of electricity to the electric motor/generator to rotate the shaft of the electric motor/generator while monitoring the signal from the position sensor.

8. The power system of claim 7, wherein operating the electric motor/generator to start the prime mover includes controlling the transmission of electricity to the electric motor/generator based on the determined rotational position of the shaft.

9. A method of operating a power system, the power system including a prime mover drivingly connected to an electric motor/generator, a first power regulator, a second power regulator, a first electrical energy storage device, and a second electrical energy storage device, the method comprising:
    starting the prime mover by
        selectively charging the first electrical energy storage device with electricity from the second electrical energy storage device by receiving electricity from the second electrical energy storage device at the first power regulator and supplying electricity from the first power regulator to the first electrical energy storage device, and
        transmitting electricity from the first electrical energy storage device to the electric motor/generator via the second power regulator to operate the electric motor/generator as an electric motor to start the prime mover.

10. The method of claim 9, further comprising:
    selectively supplying electricity from the first electrical energy storage device to a first electric power load at a first voltage; and
    selectively supplying electricity from the second electrical energy storage device to a second electric power load at a second voltage.

11. The method of claim 10, wherein the first voltage is higher than the second voltage.

12. The method of claim 10, further comprising, after starting the prime mover, operating the electric motor/generator as a generator and supplying electricity from the electric motor/generator to the first electric power load.

13. The method of claim 9, further comprising:
    before starting the prime mover, determining whether the first electrical energy storage device has enough energy to start the prime mover; and
    wherein selectively charging the first electrical energy storage device with electricity from the second electrical energy storage device before starting the prime mover includes charging the first electrical energy storage device with electricity from the second electrical energy storage device if the second electrical energy storage device has insufficient energy to start the prime mover.

14. The method of claim 9, wherein charging the first electrical energy storage device with electricity from the second electrical energy storage device includes supplying electricity from the second electrical energy storage device to the first power regulator at a first voltage and supplying electricity from the first power regulator to the first electrical energy storage device at a second voltage, higher than the first voltage.

15. A machine, comprising:
a chassis
a power system, the power system including
- a first power regulator;
- a second power regulator;
- a prime mover drivingly connected to an electric motor/generator;
- an electric power load;
- a power line operable to transmit electricity from the electric motor/generator to the electric power load;
- a first electrical energy storage device grounded to the chassis;
- a second electrical energy storage device, the second electrical energy storage device being electrically isolated from the chassis; and power-system controls configured to start the prime mover by supplying energy to the second electrical energy storage device through the second power regulator from the first electrical energy storage device, and from the second electrical energy storage device through the first power regulator to operate the electric motor/generator as an electric motor to start the prime mover.

16. The machine of claim 15, wherein starting the prime mover by using energy supplied by the second electrical energy storage device to operate the electric motor/generator as an electric motor includes transmitting electricity from the second electrical energy storage device to the electric motor/generator without transmitting the electricity to the first electrical energy storage device.

17. The machine of claim 16, wherein transmitting electricity from the second electrical energy storage device to the electric motor/generator without transmitting the electricity to the first electrical energy storage device includes
- transmitting electricity from the first electrical energy storage device to the second power regulator at a first voltage; and
- transmitting electricity to the electric motor/generator at a second voltage, higher than the first voltage.

18. The machine of claim 15, wherein the power-system controls are further operable to transmit electricity to one or more electric power loads of the power system, including
- after starting the prime mover, selectively transmitting power from the electric motor/generator and the first electrical energy storage device to a first electric power load at a first voltage; and
- selectively transmitting power from the second electrical energy storage device to a second electric power load at a second voltage.

19. The machine of claim 15, wherein starting the prime mover by using energy supplied by the second electrical energy storage device to operate the electric motor/generator as an electric motor includes
- selectively charging the first electrical energy storage device with electricity from the second electrical energy storage device; and
- transmitting electricity from the first electrical energy storage device to the electric motor/generator to operate the electric motor/generator as an electric motor to start the prime mover.

* * * * *